United States Patent
Yoshida

(10) Patent No.: US 6,568,142 B2
(45) Date of Patent: May 27, 2003

(54) BAMBOO FLOOR PLATE FOR SOUND INSULATION

(75) Inventor: Seiji Yoshida, Katano (JP)

(73) Assignee: Japan Blower Ind. Co., Ltd., Osaka (JP)

( * ) Notice: Subject to any disclaimer, the term of this patent is extended or adjusted under 35 U.S.C. 154(b) by 0 days.

(21) Appl. No.: 09/765,612

(22) Filed: Jan. 22, 2001

(65) Prior Publication Data

US 2001/0010138 A1 Aug. 2, 2001

(30) Foreign Application Priority Data

Jan. 31, 2000 (JP) .......................... 2000-021439

(51) Int. Cl.⁷ .............................. E04B 2/00; E04C 2/00
(52) U.S. Cl. ...................... 52/582.1; 52/796.1
(58) Field of Search .................. 52/582.1, 403.1, 52/796.1, 799.1, 309.4, 309.5, 309.8, 309.13

(56) References Cited

U.S. PATENT DOCUMENTS 2,573,482 A * 10/1951 Peik
3,287,203 A * 11/1966 Elmendorf
3,455,076 A * 7/1969 Clarvoe
3,579,410 A * 5/1971 Barrett
3,619,964 A * 11/1971 Passaro
4,157,640 A * 6/1979 Joannes
4,658,554 A * 4/1987 Riley
5,369,926 A * 12/1994 Borland

* cited by examiner

Primary Examiner—Carl D. Friedman
Assistant Examiner—Kevin McDermott
(74) Attorney, Agent, or Firm—Bacon & Thomas, PLLC

(57) ABSTRACT

A bamboo floor plate for sound insulation. A bamboo plate is made by forming flat a round bamboo cane. A wide groove is formed on the bamboo plate, and on both sides of a wide groove, narrow grooves are formed. The inside of the wide groove is insulated, and an electrode is embedded thereon to make a heating plate. The narrow grooves on the sides are arranged parallel to each other so that the cross section of the bamboo plate looks like a comb. A foam plastic sheet is placed on the surface on which the grooves are provided to form hollows. To connect the bamboo floor plate to another bamboo floor plate, a pin is inserted between the electrodes of the bamboo floor plates.

9 Claims, 3 Drawing Sheets

BAMBOO FLOOR PLATE FOR SOUND INSULATION

FIELD OF THE INVENTION

The present invention relates to a bamboo floor plate featuring improved sound insulation in addition to thermal insulation and heating effects.

BACKGROUND OF THE INVENTION

Sounds are generated from innumerable sources including speech, human behavior and various utensils. These sounds do not cause much of a problem in detached houses, but in multi-storied apartment houses, these sounds are transmitted through walls, ceilings and floors from one apartment to another because the apartments are adjacent to one another vertically and horizontally. Therefore, it has become commonplace to make the walls, ceilings and floors substantially thick as well as using vibration insulation and sound insulation materials.

In multi-storied apartment houses, thick ceilings, floors and walls thick are effective in insulating sound, but the use of thick components inevitably increases the volume of concrete used, and pushes up the building cost. On the other hand, to obtain the same sound insulating effect using an alternative material can result in a complicated structure, which also increases the building cost. As such, an aesthetic and low-cost building material having a sound insulating effect, strength and polish has been desired, but such a material has not been materialized so far.

Bamboo materials are easy to reproduce. Thanks to the advances in production devices, it is now possible to flatten a round bamboo cane or make laminated bamboo materials of enlarged sizes at low cost. The value of bamboo as a building material has increased, and its use as an alternative material for some applications that were exclusively achieved by wood in the past has recently been studied. A bamboo plate is characterized by a surface grain made by straight fibers, which provides it with hardness and high flexural strength. On the other hand, a bamboo plate is not very effective in insulating sound. As a flooring material, a bamboo plate barely achieves Class 2 of the lightweight floor impact value LL of JIS (Japanese Industrial Standard).

SUMMARY OF THE INVENTION

The objective of the present invention is to provide a bamboo floor plate for sound insulation that is used as a building material, featuring the bamboo's aesthetic appearance and strength as well as improved sound insulation, thermal insulation and a heating capability.

The present invention is a bamboo floor plate for sound insulation comprising a bamboo plate made by developing a round bamboo cane flat or by cutting it into pieces and laminating them till they make a plate of an adequate size, characterized in that several grooves are formed on the bamboo plate, and a non-bamboo plate is pasted on the surface on which the grooves are provided, and several hollows are formed between the bamboo plate and the non-bamboo plate.

In this invention, a bamboo cane is developed flat and laminated with glue into an adequate size bamboo plate for use as a building material. On one surface of the bamboo plate, several grooves are provided at adequate intervals to form hollows that prevent transmission of sounds as well as to eliminate the causes for warping. On the surface on which the grooves are provided, a non-bamboo plate is glued to make a compound bamboo plate with hollows, thereby improving the sound insulation and thermal insulation effects. The many grooves are effective in softening the hardness of the surface on which the grooves are provided.

The bamboo plate equipped with such effects retains the bamboo's original aesthetic appearance. In a simplified test for floor impact sounds on a concrete floor using a 15 to 16 mm thick compound bamboo plate (i.e. combination of the above bamboo plate and a foam plastic sheet), the lightweight floor impact value LL of the JIS was approximately 30 dB at an octave range middle frequency of 500 Hz. This translates into an improvement of approximately 40 dB in the floor impact sound compared with a simple concrete floor. This sound insulation value corresponds to L-40 of the sound insulation classification.

When a combination of the above bamboo plate with a non-woven fabric is directly spread on a concrete floor, the lightweight impact value LL was 41 dB at 500 Hz and 34 dB at 1000 Hz, translating into floor impact sound level improvements of 32 and 39 dB respectively, indicating that its frequency characteristic was different from the one combined with the foam plastics heet. When the above compound bamboo plate was installed on the joists filled with glass wool on a concrete floor, similar results were obtained.

The hollows formed in the bamboo plate for sound insulation is also effective in increasing thermal insulation in addition to sound insulation, and is useful in softening the hardness of the bamboo plate as well as preventing its warping. When the bamboo plate for sound insulation is glued on a concrete floor, which has low smoothness, the addition of a non-bamboo material to the bamboo plate for sound insulation improves the adhesion to the other material, simplifying and speeding up the construction.

The plate to cover the surface on which the grooves are provided is made by combining various materials selected from foam materials made of thermoplastic or thermosetting plastic or rubber, or from non-woven sheets, using glue. The material made as such has adequate elasticity on its surface so that even if there is some roughness on the surface of the other part, such roughness is easily absorbed. As a result, the flatness of the floor surface is maintained. Such a plate, therefore, makes an excellent building material providing both sound insulation and thermal insulation. It is also possible to insert a hard material such as lumber in between the surface on which the grooves are provided and the above-mentioned materials.

To make a heating plate that forms a building material equipped with a heating capability, a sheet-shaped heating plate equipped with an electrode of an adequate shape sandwiched by insulation materials can be inserted in between the bamboo plate and the non-bamboo plate. Or, conductive resin made by mixing conductive carbon powder (e.g. carbide) into a plastic material in a weight ratio of 30 to 60% can be embedded in the groove with an electrode, the inside of which is insulated. In this structure, it is preferable that a material with a high thermal insulation capability be used for the non-bamboo plate.

To make the thickness of the bamboo floor plate for sound insulation within the range of 10 to 25 mm, the thickness of the bamboo plate itself or the laminated plate of the bamboo plate and plywood should be within the range of 5 to 15 mm. The thickness of the plate combined with a non-bamboo plate should be: 0.5 to 15 mm if the non-bamboo plate is a foam sheet made of a rubber or plastic material; 3 to 15 mm if the non-bamboo plate is a non-woven fabric; and 1 to 5 mm if the non-bamboo plate is a sheet-shaped heating plate. The cross section of the groove should be rectangular or trapezoid. The arrangement of the grooves should be selected from parallel, perpendicular or crossed with respect to the fiber of the bamboo.

The depth of each groove is selected from within the range of 10 to 70%, preferably 20 to 60% of the thickness of the bamboo plate itself or the laminated plate made of the bamboo plate and plywood. The width of each groove is selected from within the range of 1 to 10 mm, preferably 1 to 5 mm. The interval between the grooves is selected from within the range of two to twenty times, preferably eight to fifteen times that of the width of each groove. The size of the groove should be large for the purpose of filling heating materials within for heating, and small for the purpose of sound insulation. The flooring material may be a square-shaped panel, but a rectangular material combining a width of 70 to 160 mm and a length of 700 to 2000 mm costs less and is easier to use.

Usually the grooves are formed by cutting into the bamboo plate. However, that requires a thick bamboo plate, which pushes up the production cost. To avoid this, it is possible to make the grooves from a combination of a primary material and a plurality of secondary materials, which are combined by an adhesive. The primary and secondary materials are each made from a thin bamboo plate itself or the laminated plate made of a thin bamboo plate and plywood. The secondary material may be of the same length as the width of the primary material and has the width range of 10 to 50 mm, preferably 15 to 40 mm. The thickness of the secondary materials is the same as the depth in the preceding paragraph. The space between each secondary materials is also the same as in the preceding paragraph.

BRIEF DESCRIPTION OF THE DRAWINGS

Other features and advantages of the invention will appear as the description proceeds when considered in conjunction with the accompanying drawings, in which.

DETAILED DESCRIPTION OF THE INVENTION

EXAMPLE 1

Figure 1:
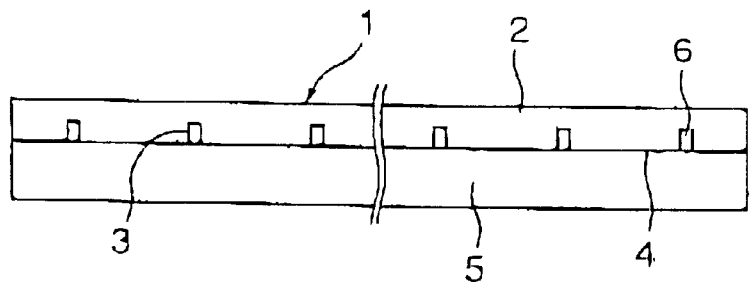
FIG. 1 is a longitudinal cross section of a bamboo floor plate for sound insulation using a bamboo plate according to a first embodiment.

FIG. 1 is a longitudinal section of a bamboo floor plate 1 for sound insulation. This floor plate 1, which is 14 mm thick, is made by laminating a 2 mm thick bamboo plate on a 4 mm thick plywood plate to make a bamboo plate 2 having a thickness of 6 mm and a width of approximately 90 mm. This bamboo plate 2 is provided with grooves 3, and on the surface 4 on which the grooves 3 are provided, an 8 mm thick foam plastic sheet 5 is glued. The grooves 3, each having a width of 1.5 mm and a depth of 3 mm (50% of the thickness of the bamboo plate) and running at a right angle to the longitudinal direction of the bamboo plate 2, are arranged parallel to each other at 15 mm intervals so that the cross section of the bamboo plate 2 looks like a comb. These grooves 3 form hollows 6 between the bamboo plate 2 and the foam plastic sheet 5. The surface of the bamboo floor plate 1 retains the bamboo's original grain.

This bamboo floor plate 1 was tested for an LL value in a simplified floor impact sound level test according to JIS, and the resulting LL value was found to be 44 dB better at an octave range middle frequency of 500 Hz compared with those of a concrete plate (RC floor plate with a thickness of 150 mm) and a plywood/concrete plate (RC floor plate with a thickness of 150 mm). The use of this bamboo floor plate 1 in a building not only simplifies the construction compared with conventional methods, but also contributes to the building of a more comfortable living environment thanks to its better sound insulation effect.

EXAMPLE 2

The next example or embodiment has no visible differences in structure from the previous embodiment (Example 1), and this embodiment is also illustrated by FIG. 1. The bamboo floor plate 1 for sound insulation of this example is 15 mm thick, and comprises a bamboo plate 2 having a width of approximately 90 mm and a thickness of 7 mm and provided with grooves 3. On the surface on which the grooves 3 are provided, an 8 mm thick foam plastic sheet 5 is glued. The grooves 3, each having a width of 1.5 mm and a depth of 2 mm (28% of the thickness of the bamboo plate 2), are arranged parallel to each other at 15 mm intervals so that the cross section of the bamboo plate 2 looks like a comb. These grooves 3 form hollows 6 between the bamboo plate 2 and the foam plastic sheet 5. The surface of the bamboo floor plate 1 retains the bamboo's original grain. This bamboo floor plate 1 was tested in a simplified floor impact sound level test for comparison as in Example 1, and the resulting LL value was found to be 43 dB better at 500 Hz, or virtually the same as in Example 1.

EXAMPLE 3

The next example or embodiment also has no visible differences in structure from the two previous embodiments (Examples 1 and 2), and this embodiment is also illustrated by FIG. 1. The bamboo floor plate 1 for sound insulation of this example is 16 mm thick, and comprises a bamboo plate 2 having a width of approximately 90 mm and a thickness of 8 mm and provided with grooves 3. On the surface on which the grooves 3 are provided, an 8 mm thick non-woven sheet 5 is glued. The grooves 3, each having a width of 1.5 mm and a depth of 2 mm (25% of the thickness of the bamboo plate 2), are arranged parallel to each other at 15 mm intervals so that the cross section of the bamboo plate 2 looks like a comb. These grooves 3 form hollows 6 between the bamboo plate 2 and the non-woven sheet (foam plastic sheet 5). The surface of the bamboo floor plate 1 retains the bamboo's original grain.

This bamboo floor plate 1 was tested in a simplified floor impact sound level test for comparison as in Example 1, and the resulting LL value was found to be 32 dB better at 500 Hz and 39 dB better at 1000 Hz. These results indicate that by combining different types of non-bamboo plates with the bamboo plate 2, different frequency characteristics can be obtained. The effect obtained by this example is virtually the same as that of Example 1.

EXAMPLE 4

Figure 2:
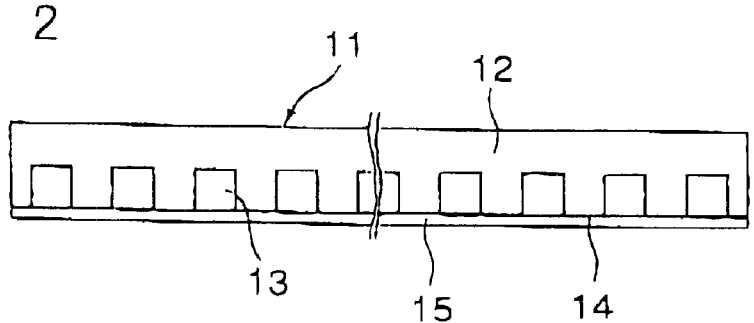
FIG. 2 is a longitudinal cross section of a bamboo floor plate for sound insulation incorporating a thermal insulation material according to a second embodiment.

FIG. 2 is a longitudinal section of a bamboo floor plate 11 for sound insulation. This floor plate 11, which is 13.5 mm, is made by gluing a 1.5 mm thick rubber sheet 15 on a bamboo plate 12, which is approximately 90 mm wide and 12 mm thick. This bamboo plate 12 is provided with grooves 13, and the rubber sheet 15 is glued on the surface 14 on which the grooves 13 are provided. The grooves 13, each having a width of 5 mm and a depth of 6 mm (50% of the thickness of the bamboo plate 12) and running at a right angle to the longitudinal direction of the bamboo plate 12, are arranged parallel to each other at intervals that are twice as large as the width of the groove 13 so that the cross section of the bamboo plate 12 looks like a comb. These grooves 13 form hollows 16 between the bamboo plate 12 and the rubber sheet 15. The surface of the bamboo floor plate 11 retains the bamboo's original grain.

In the above structure, the rubber sheet 15 is so elastic as to absorb the roughness, if any, on the surface of the other part, maintaining the flatness of the floor after the flooring material has been installed. The rubber also has a characteristic of absorbing vibration. In the above combination, using a thick rubber sheet 15 strengthens the floor plate (11)'s resistance to vibration as well as providing it with a heat insulating effect thanks to the large hollows 16 obtained. A foam rubber sheet can also be used.

EXAMPLE 5

Figure 3:
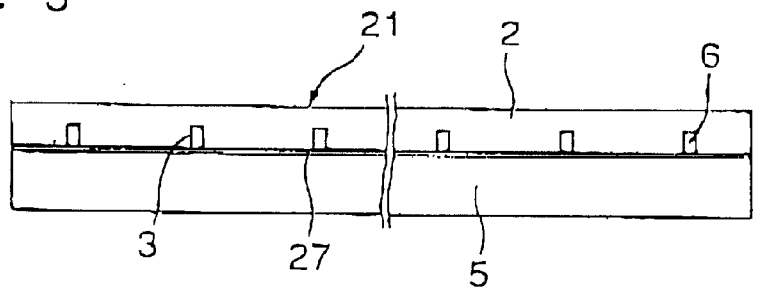
FIG. 3 is a longitudinal cross section of a bamboo floor plate for sound insulation equipped with a heating plate according to a third embodiment.

FIG. 3 is a bamboo floor plate 21 equipped with a floor heating capability. This floor plate 21 is made by inserting a heating plate 27 with electrodes in between the surface 4 on which the grooves 3 are provided and the foam plastic sheet 5 of Example 1. The heating plate 27 is covered by an insulated sheet on which an appropriate electric circuit is formed with a conductive material. The plate 21 achieved by this example also has a heating effect as in other examples, and is also quite easy to install on the floor.

EXAMPLE 6

Figure 4:
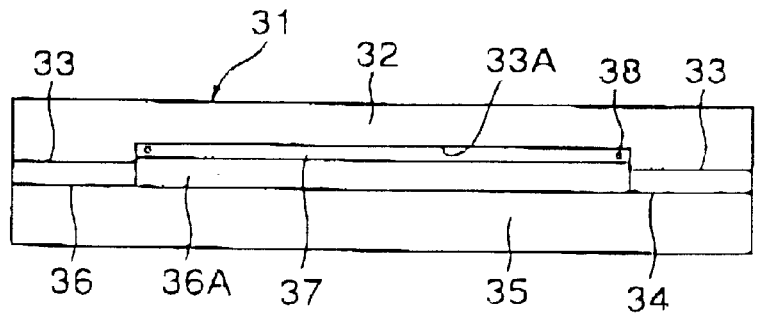
FIG. 4 is a transversal cross section of a bamboo floor plate for sound insulation equipped with a heating plate according to a fourth embodiment.

FIG. 4 is a transversal section of a bamboo floor plate 31 for sound insulation. This floor plate 31, which is 20 mm, is made of a bamboo plate 32 having a width of approximately 90 mm and a thickness of 12 mm and an 8 mm foam plastic sheet 35 glued on the surface 34 of the bamboo plate 32 on which a wide groove 33A is formed in the middle and narrow grooves 33 are formed on the sides. The wide groove 33A in the middle of the bamboo plate 32 is 60 mm wide and 6 mm deep (50% of the thickness of the bamboo plate 32), and runs along the length of the bamboo plate 32. The narrow grooves 33 at the sides, each having a width of 1.5 mm and a depth of 3 mm (25% of the thickness of the bamboo plate 32) and running at a right angle to the wide groove 33A, are arranged parallel to each other at 15 mm intervals so that the cross section of the bamboo plate 32 looks like a comb. These grooves 33, 33A form hollows 36, 36A between the bamboo plate 32 and the foam plastic sheet 35. The surface 34 of the bamboo floor plate 31 retains the bamboo's original grain.

The inside of the wide groove 33A is insulated. Conductive resin made by mixing a conductive material, which is a powdered carbide of bamboo, into a plastic in a weight ratio of 50:100 is embedded in the ceiling side of the groove 33A with an electrode 38 for a depth of 2 mm to make a heating plate 37. The lower side is a hollow 36A. As shown in the longitudinal cross section of FIG. 5, the electrode 38 has a female receptacle at its end, so that two bamboo floor plates 31 can be joined by inserting a pin 39 in between the two receptacles. This example also has a heating effect as the other examples, and is easy to install on the floor.

EXAMPLE 7

Figure 6:
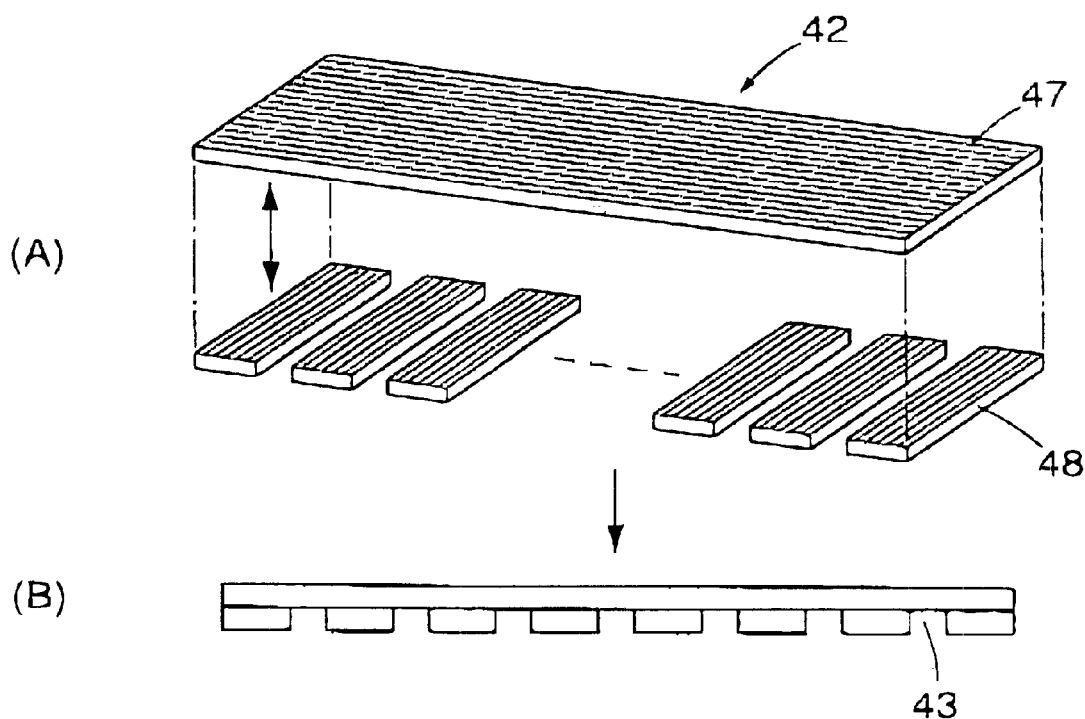
FIG. 6 is a bamboo plate comprising of a primary material and a plurality of secondary materials. (A) is a perspective thereof before combining them and (B) is a cross section after combining them.

As shown in FIG. 6(A), the bamboo plate 42 is divided into a primary material 47 and a plurality of secondary materials 48. The two materials 47, 48 are combined as indicated in (A), in which parallel lines are fiber directions. As shown in FIG. 6(B), the secondary materials 48 are of the same length of the width of the primary material 47 (about 90 mm), and has the width of about 20 mm. The secondary materials 48 are arranged at the interval of 10 mm in the longitudinal direction of the primary material 47. The thickness of the bamboo plate 42 after combining them with an adhesive is 8 mm. Hollows 46 are formed between adjacent secondary materials 48.

Figure 5:
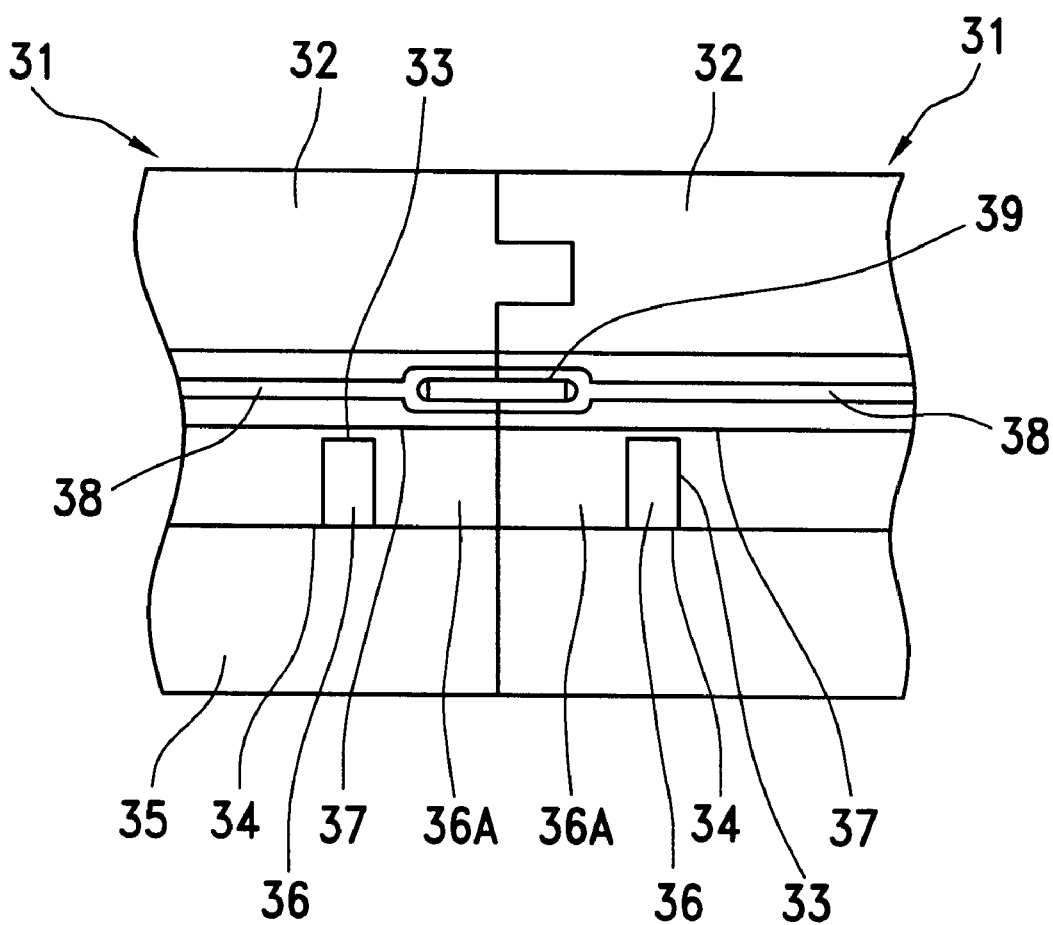
FIG. 5 is an enlarged cross section of the joint of bamboo floor plates of FIG. 4.
Figure 7:
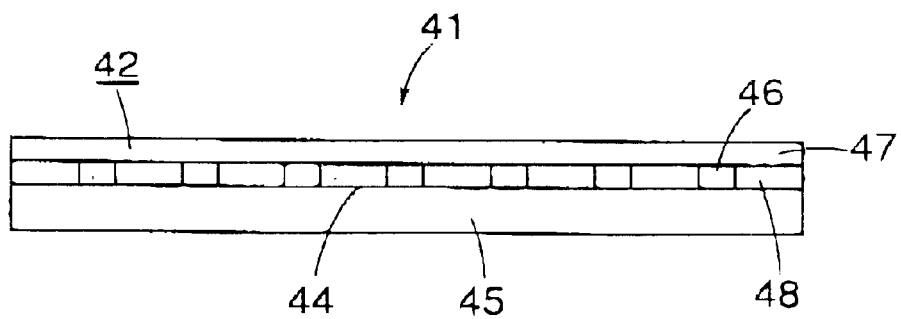
FIG. 7 is a longitudinal cross section of the bamboo plate for sound insulation using the plate of FIG. 6.

FIG. 7 shows a bamboo plate 41 for sound insulation having the total thickness of 16 mm, which is made by attaching the foam plastic sheet 45 on the surface 44 of the bamboo plate 42 on which grooves 43 are formed. When the grooves 43 are covered with the foam plastic sheet 45, they form hollows 46. As in other Examples, a heating plate 37 (as shown in FIG. 5) may be inserted between the bamboo plate 41 and a non-bamboo plate to obtain the same results.

In the drawings and specification, there has been set forth preferred examples of the invention, and although specific terms are employed, they are used in a generic and descriptive sense only and not for the purpose of limitation, the scope of the invention being set forth in the following claims.

What is claimed is:

1. A bamboo floor plate for sound insulation comprising:
   a bamboo plate,
   a plurality of grooves formed on the bamboo plate,
   a non-bamboo plate pasted on the surface on which the grooves are provided, and
   a plurality of hollows formed between the bamboo plate and the non-bamboo plate.

2. A bamboo floor plate for sound insulation according to claim 1, wherein the non-bamboo plate is a sheet made of foam plastic or a non-woven fabric.

3. A bamboo floor plate for sound insulation according to claim 1, wherein a heating plate is inserted between the bamboo plate and the non-bamboo plate.

4. A bamboo floor plate for sound insulation according to claim 1, wherein one of the grooves of the bamboo plate is a wide groove, which is formed along the longitudinal direction of the bamboo plate, and the inside of the groove is insulated while an electrode made of conductive resin made of plastic and carbon powder is embedded in the ceiling of the groove to form a heating plate.

5. A bamboo floor plate for sound insulation according to claim 1, wherein the grooves of the bamboo plate runs at right angles with respect to the longitudinal direction.

6. A bamboo floor plate for sound insulation according to claim 4, wherein the electrode of the heating plate formed in the wide groove has a female receptacle at its end, and a pin is inserted in between the receptacles of the electrodes to be connected to.

7. A bamboo floor plate for sound insulation comprising:
a bamboo plate made by combining a primary material with a plurality of secondary materials,
a plurality of grooves formed on the primary material and between adjacent secondary materials,
a non-bamboo plate pasted on the surface on which the grooves are provided, and
a plurality of hollows formed between the bamboo plate and the non-bamboo plate.

8. A bamboo floor plate for sound insulation according to claim 7, wherein the non-bamboo plate is a foam plastic sheet or a non-woven fabric sheet.

9. A bamboo floor plate for sound insulation according to claim 7, wherein a heating plate is inserted between the bamboo plate and the non-bamboo plate.

* * * * *